US012617219B2

(12) United States Patent (10) Patent No.: US 12,617,219 B2
Jogo et al. (45) Date of Patent: May 5, 2026

(54) PRINTING APPARATUS, PRINTING METHOD, AND STORAGE MEDIUM

(71) Applicant: CANON KABUSHIKI KAISHA, Tokyo (JP)

(72) Inventors: Jumpei Jogo, Tokyo (JP); Yuji Konno, Kanagawa (JP); Takeshi Yazawa, Kanagawa (JP); Masaki Nitta, Kanagawa (JP); Hidehiko Kanda, Kanagawa (JP); Takayuki Ushiyama, Chiba (JP); Taichi Yokokawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/596,895

(22) Filed: Mar. 6, 2024

(65) Prior Publication Data

US 2024/0308245 A1     Sep. 19, 2024

(30) Foreign Application Priority Data

Mar. 13, 2023    (JP) ................................. 2023-038989

(51) Int. Cl.
| | |
|---|---|
| *B41J 11/00* | (2006.01) |
| *B41J 2/045* | (2006.01) |
| *B41J 29/377* | (2006.01) |
| *B41J 29/38* | (2006.01) |
| *C09D 11/30* | (2014.01) |
| *C09D 11/54* | (2014.01) |

(52) U.S. Cl.
CPC ..... *B41J 11/00222* (2021.01); *B41J 2/04553* (2013.01); *B41J 2/04563* (2013.01); *B41J 29/38* (2013.01); *C09D 11/30* (2013.01); *C09D 11/54* (2013.01); *B41J 11/00242* (2021.01)

(58) Field of Classification Search
CPC .................. B41J 29/377; B41J 11/0022; B41J 11/00222; B41J 2/04553; B41J 2/04563; B41J 29/38
See application file for complete search history.

(56) References Cited

U.S. PATENT DOCUMENTS

| | | | |
|---|---|---|---|
| 7,258,412 | B2 | 8/2007 | Maru |
| 7,261,387 | B2 | 8/2007 | Nishikori |
| 7,287,830 | B2 | 10/2007 | Ide |
| 7,296,872 | B2 | 11/2007 | Hayashi |
| 7,303,247 | B2 | 12/2007 | Maru |
| 7,325,900 | B2 | 2/2008 | Hayashi |

(Continued)

FOREIGN PATENT DOCUMENTS

JP            2018-192690 A      12/2018

OTHER PUBLICATIONS

"Paper and Board—Determination of the Liquid Absorbability—Bristow's Method," Japan TAPPI Paper Pulp Test Method No. 51, Japan TAPPI Paper and Pulp Test Methods, 2000, p. 51/1-51/6.

*Primary Examiner* — Scott A Richmond
(74) *Attorney, Agent, or Firm* — Venable LLP

(57) ABSTRACT

Provided is an inkjet printing apparatus, an inkjet printing method, and a storage medium capable of causing less density unevenness. To this end, in a case where an expected pause time is larger than a predetermined threshold T (s), a platen air blowing unit blows air to the surface of a printing medium on a platen at a wind speed lower than that during printing.

18 Claims, 10 Drawing Sheets

(56) References Cited

U.S. PATENT DOCUMENTS

| | | | |
|---|---|---|---|
| 7,328,963 | B2 | 2/2008 | Tajika |
| 7,408,676 | B2 | 8/2008 | Yazawa |
| 7,758,153 | B2 | 7/2010 | Tanaka |
| 7,819,497 | B2 | 10/2010 | Konno |
| 8,079,659 | B2 | 12/2011 | Tajika |
| 8,186,783 | B2 | 5/2012 | Yasutani |
| 8,287,074 | B2 | 10/2012 | Kano |
| 8,342,649 | B2 | 1/2013 | Yazawa |
| 8,439,472 | B2 | 5/2013 | Yasutani |
| 8,469,484 | B2 | 6/2013 | Jogo |
| 8,511,787 | B2 | 8/2013 | Yasutani |
| 8,579,401 | B2 | 11/2013 | Iritani |
| 8,613,492 | B2 | 12/2013 | Suzuki |
| 8,702,192 | B2 | 4/2014 | Danzuka |
| 8,786,896 | B2 | 7/2014 | Marumoto |
| 8,882,228 | B2 | 11/2014 | Ojiro |
| 8,888,204 | B2 | 11/2014 | Iritani |
| 8,888,223 | B2 | 11/2014 | Oonuki |
| RE45,265 | E | 12/2014 | Yano |
| 8,939,540 | B2 | 1/2015 | Fletcher |
| 9,007,653 | B2 | 4/2015 | Ojiro |
| 9,120,304 | B2 | 9/2015 | Konno |
| 9,227,423 | B2 | 1/2016 | Yazawa |
| 9,545,791 | B2 | 1/2017 | Oonuki |
| 9,656,459 | B2 | 5/2017 | Kuwabara |
| 10,336,101 | B2 | 7/2019 | Sasaki |
| 11,813,853 | B2 | 11/2023 | Kawafuji |
| 11,840,079 | B2 | 12/2023 | Kuriyama |
| 11,840,101 | B2 | 12/2023 | Ushiyama |
| 11,919,300 | B2 | 3/2024 | Kawafuji |
| 11,999,177 | B2 | 6/2024 | Kanda |
| 2009/0021549 | A1 | 1/2009 | Muto |
| 2015/0202891 | A1* | 7/2015 | Sasaki ..................... B41J 11/36 |
| | | | 347/104 |
| 2018/0333971 | A1 | 11/2018 | Sasaki |
| 2019/0100039 | A1* | 4/2019 | Matsuoka ............ B41J 11/0022 |
| 2019/0270321 | A1* | 9/2019 | Asamoto ............... B26D 1/065 |
| 2022/0324223 | A1 | 10/2022 | Nagai |
| 2023/0191798 | A1 | 6/2023 | Nitta |
| 2023/0202193 | A1 | 6/2023 | Yamamuro |

* cited by examiner

PRINTING APPARATUS, PRINTING METHOD, AND STORAGE MEDIUM

BACKGROUND OF THE INVENTION

Field of the Invention

The present invention relates to a printing apparatus, a printing method, and a storage medium.

Description of the Related Art

Some inkjet printing apparatuses perform multi-pass printing and print an image by having a printhead scan in a main scanning direction a plurality of times. During a printing operation in multi-pass printing, the printing operation may be interrupted by a pause due to a recovery operation or the like. In a case where the pause time is long, a print region affected by the pause may have unevenness because the density and/or tone changes due to a difference in how dry an ink applied to the printing medium is. In this regard, it is known that this is related to smudge made by a predetermined pass and the subsequent pass. More specifically, in a case where a printing operation is interrupted by a pause between a predetermined pass and the subsequent pass, an ink printed before the pause dries during the pause, and the state of smudge made by a contact between that ink and an ink applied by the subsequent pass would be different.

Also, in some inkjet printing apparatuses, during printing, air is blown to an area near the printhead in order to promote fixation of ink. Density unevenness may also be caused by drying promoted by the air blowing, changing the state of smudge.

Japanese Patent Laid-Open No. 2018-192690 discloses a method of reducing the wind speed of an air blower fan in a case where an ambient environment temperature is lower than a set temperature.

The method of Japanese Patent Laid-Open No. 2018-192690 is intended to prevent excessive dryness during a printing operation, and there is no mentioning of control performed during a pause of a printing operation. Thus, the above-described unevenness in density may occur.

SUMMARY OF THE INVENTION

Thus, the present invention provides a printing apparatus, a printing method, and a storage medium that are capable of causing less density unevenness.

To that end, a printing apparatus of the present invention comprises a printing unit configured to perform printing operation by ejecting a liquid onto a printing medium;

a support unit configured to support the printing medium to be printed by the printing unit;

a roller configured to convey the printing medium in a conveyance direction toward the support unit;

a blowing unit, provided upstream of the printing unit in the conveyance direction, configured to blow air onto the printing medium supported by the support unit in a state where the printing operation is performed by the printing unit; and a control unit configured to perform control such that the air is blown at a first speed in a case where an interruption time during which the printing operation is interrupted before completion of the printing operation is a first time, and the air is blown at a second speed which is faster than the first speed in a case where the interruption time is a second time which is shorter than the first time.

The present invention can provide a printing apparatus, a printing method, and a storage medium that are capable of causing less density unevenness.

Further features of the present invention will become apparent from the following description of exemplary embodiments with reference to the attached drawings.

DESCRIPTION OF THE EMBODIMENTS

An embodiment of the present invention is described below with reference to the drawings.

Figure 1:
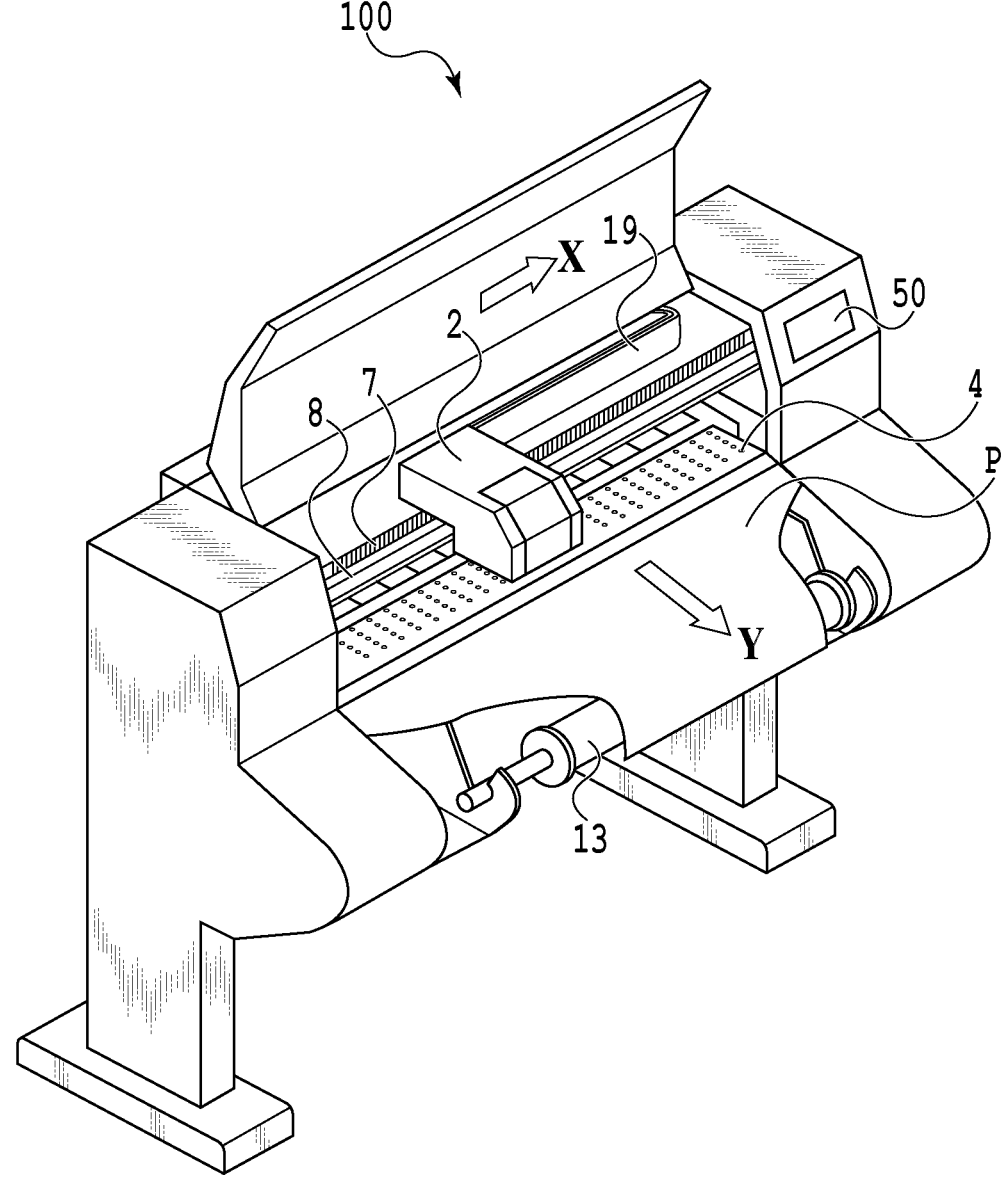
FIG. 1 is an external view of an inkjet printing apparatus.
Figure 2:
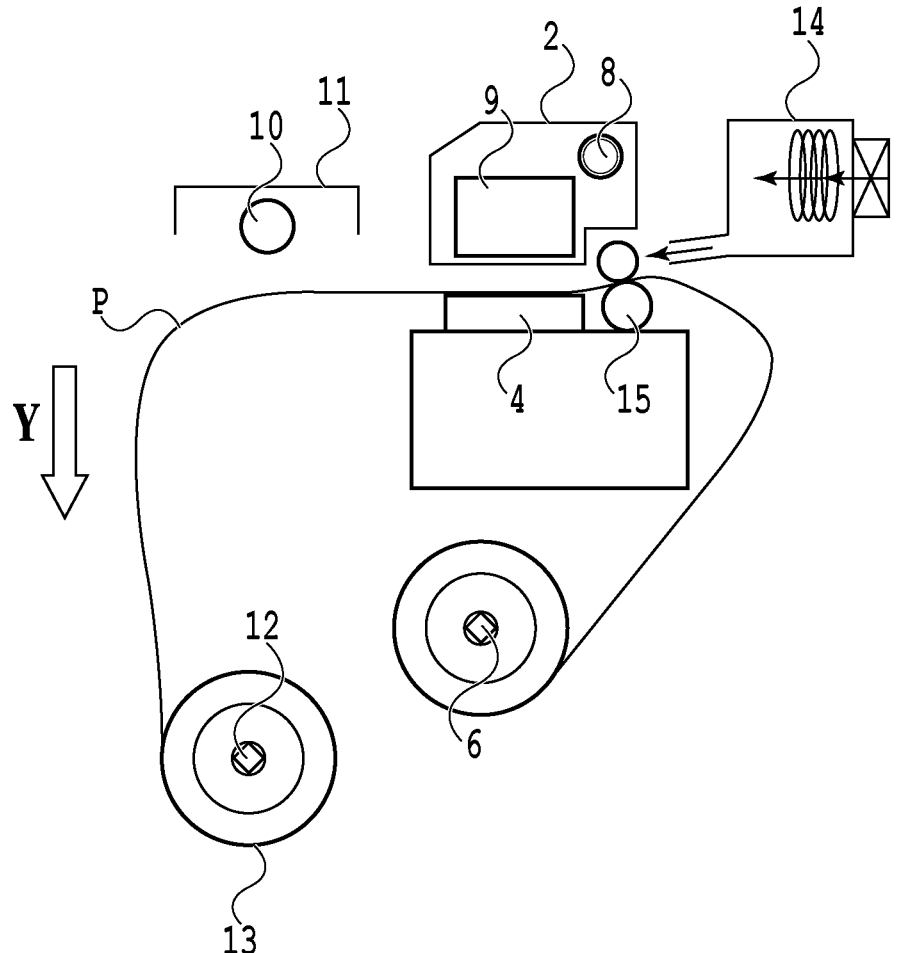
FIG. 2 is a schematic side view showing a main part of the printing apparatus.

FIG. 1 is an external view of an inkjet printing apparatus (hereinafter also referred to as a printing apparatus) 100 to which the present embodiment can be applied, and FIG. 2 is a schematic side view showing a main part of the printing apparatus 100. The printing apparatus 100 includes a carriage unit 2 that has a printhead 9 attached thereto and moves in a reciprocating manner along a guide shaft 8 extending in an X-direction, a spool 6 that holds a printing medium P, a heater 10, a heater cover 11, and a platen 4 that supports the printing medium P being printed. The printing apparatus 100 also includes a platen air blowing unit 14 that blows air to the printing unit, a roll of reeled medium 13 which is the printing medium P reeled by a reel spool 12, and a flexible wiring board 19 that supplies electricity and signals to the printhead 9. The printing apparatus 100 further includes an encoder 7 that obtains positional information on the carriage unit 2, conveyance rollers 15 that convey the printing medium P, and a UI screen 50 that displays the status of the printing apparatus 100.

The printing apparatus 100 is what is called a serial-scan printing apparatus and prints an image on the printing medium P by moving the printhead 9 in the scanning direction (the X-direction in FIG. 1) intersecting with the conveyance direction of the printing medium P (the Y-direction in FIG. 1) and applying ink (liquid) to the printing medium P while the printhead P is moved. The printing medium P is drawn from the spool 6 holding the printing medium P and is conveyed in the Y-direction by the pair of conveyance rollers 15 driven via gears by a conveyance motor (not shown). Meanwhile, at a predetermined conveyance position in the Y-direction, the carriage unit 2 is scanned in a reciprocating manner (moved in a reciprocating manner) along the guide shaft 8 extending in the X-direction, as driven by a carriage motor (not shown).

In this scanning process, an ejection operation is performed, in which ink is ejected from ejection ports of the printhead 9 detachably attached to the carriage unit 2 at a timing based on a position signal obtained from the encoder 7. As a result of this, printing can be done on a certain band width corresponding to the area over which the ejection ports are arranged. The configuration of the printhead 9 will be described later. In the present embodiment, the scanning speed is 30 inches per second, and the ejection operation is performed at a printing resolution of 1200 dpi (an interval of 1/1200 inches). After that, the printing medium P is conveyed, and printing is performed for the next band width.

A carriage belt is used to transmit the driving power from the carriage motor to the carriage unit 2. Note that in place of the carriage belt, a different driving method may be used, such as, for example, one having a lead screw that is driven and rotated by the carriage motor and extends in the X-direction and an engagement portion that is provided at the carriage unit 2 and engages with a groove in the lead screw.

The printing medium P fed and conveyed from the spool 6 is held between and conveyed by the conveyance rollers 15 and a pinch roller and is led to a print position on the platen 4, i.e., into a region to be scanned by the printhead. Usually, in an idle state in which no printing is performed, the ejection port surface of the printhead 9 is capped. For this reason, the printhead 9 is decapped before printing to bring the carriage unit 2 to a scannable state. After that, once data for one scan of the carriage unit 2 is accumulated in a buffer, the carriage unit 2 is moved as driven by the carriage motor and performs a printing operation. The printing medium P having an image printed thereon by the printhead 9 is reeled by the reel spool 12 and is formed into the roll of reeled medium 13.

The flexible wiring board 19 is attached to the printhead 9 to supply drive pulses, head temperature adjustment signals, and the like for the ejection operation. The other end of the flexible wiring board 19 is connected to a control unit (not shown) including a control circuit such as a CPU that controls the printing apparatus 100. The UI screen 50 allows a user to input cancellation of a printing operation and to check information on the printing medium P.

Now, a description is given of the configuration for drying and fixating ink. The platen air blowing unit 14 blows heated air (warm air) against the surface of the printing medium P on the platen 4. This promotes evaporation of moisture contained in the ink ejected to the surface of the printing medium P and therefore promotes fixation of the ink. Note that the platen air blowing unit 14 may be a unit that does not have a heat source and only performs air blowing. Also, a curing region is provided at a position downstream, in the conveyance direction (the Y-direction), of a position where the printhead 9 attached to the carriage unit 2 scans in a reciprocating manner in the scanning direction. The heater 10 (see FIG. 2) supported by a frame (not shown) is disposed at this curing region, and the liquid-form liquid applied to the printing medium P is thermally dried. As the heater 10, a sheathed heater, a halogen heater, or the like is used. The heater cover 11 covers the heater 10 and serves the function of efficiently radiating the printing medium P with the heat from the heater 10 and the function of protecting the heater 10.

A heating temperature for the curing region is set considering the film formability and productivity of water-soluble resin particles contained in the ink and the heat resistance of the printing medium P. As means for heating the curing region, heating from above by warm air blowing, heating from below the printing medium P using a contact-type heat-conduction-type heater, or the like may be used. Although the means for heating the curing region by the heating unit is at one location in the present embodiment, it may be located at two or more locations and used together as long as the temperature measured by a radiation thermometer (not shown) above the printing medium P does not exceed the set value for the heating temperature.

The printing apparatus 100 of the present embodiment performs what is called multi-pass printing, in which the printhead performs a plurality of scans (n times where n is an integer of 2 or greater) to print an image on a predetermined region (a region corresponding to 1/n) on the printing medium P. Multi-pass printing will be described in detail later.

Figure 3:
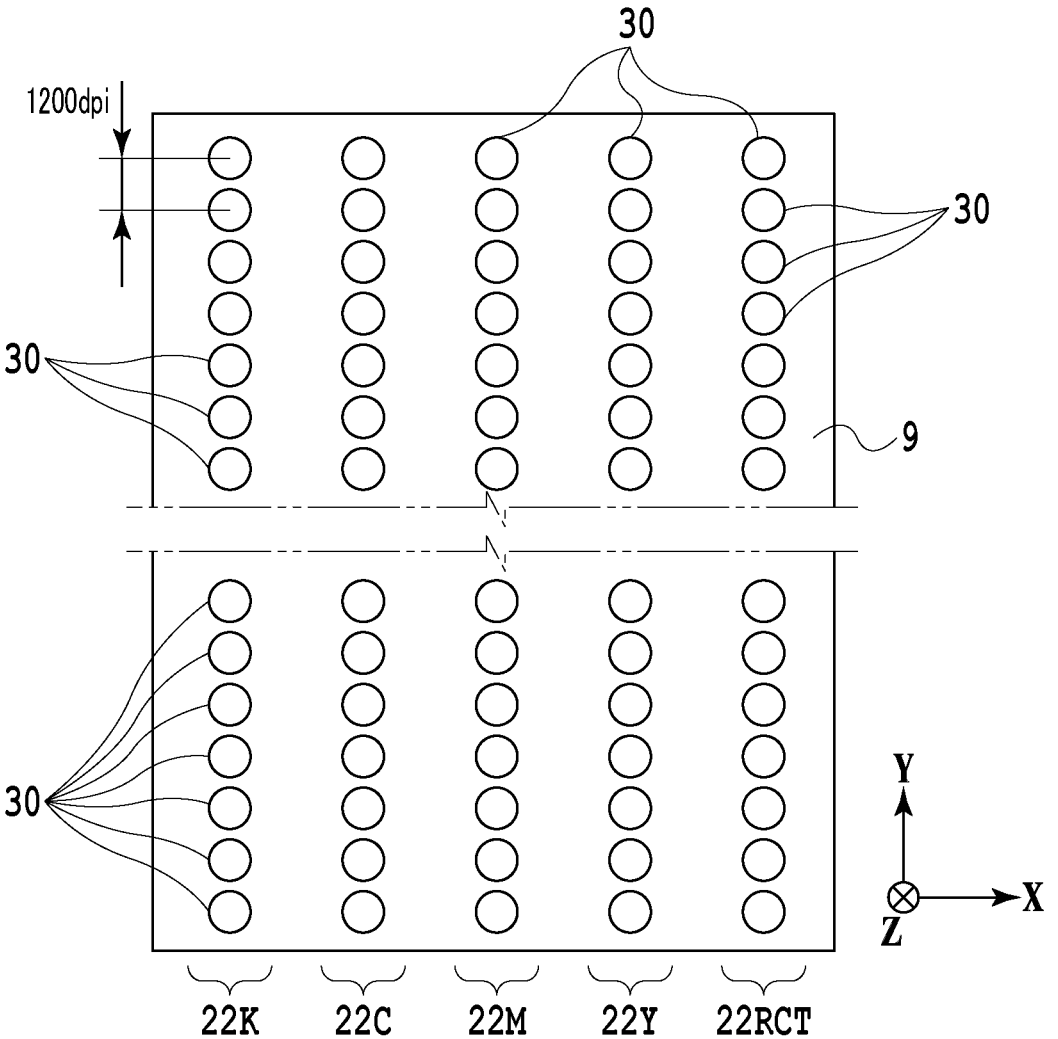
FIG. 3 is a diagram showing the ejection port surface of a printhead where ejection ports are provided.

FIG. 3 is a diagram showing the ejection port surface of the printhead 9 where ejection ports 30 are provided. The printhead 9 includes an ejection port array 22K that ejects a black ink (K), an ejection port array 22C that ejects a cyan ink (C), an ejection port array 22M that ejects a magenta ink (M), and an ejection port array 22Y that ejects a yellow ink (Y). Because these inks contain color materials, they may be referred to also as color material inks or color inks.

The printhead 9 also includes an ejection port array 22RCT that ejects an reaction liquid ink (RCT) containing no color material. The reaction ink contains no color material but contains a reactive component that reacts with a color material contained in a color material ink. By coming into contact with a color material ink on a printing medium and reacting therewith, the reaction ink can reduce smudging and bleeding of the color material ink.

On the printhead 9, the ejection port arrays 22K, 22C, 22M, 22Y, and 22RCT are arranged side by side in this order from the left side to the right side in the X-direction in FIG. 3. These ejection port arrays 22K, 22C, 22M, 22Y, and 22RCT each have 1280 ejection ports 30 arranged in the Y-direction (the array direction) at a density of 1200 dpi, each ejection port 30 ejecting a corresponding ink. Note that in the present embodiment, the amount of ink droplet ejected from a single ejection port 30 (the ejection amount) is approximately 4.5 pl.

These ejection port arrays 22K, 22C, 22M, 22Y, and 22RCT are connected to respective ink tanks (not shown) that retain corresponding inks, and an ink is supplied from each ink tank to its corresponding ejection port array. Note that the ink tanks may be configured integrally with the printhead 9 or may be configured separably.

Also, the above color material inks each may contain, e.g., water-soluble resin particles that form a film by being heated and improve abrasion resistance of an image printed on a printing medium.

Figure 4:
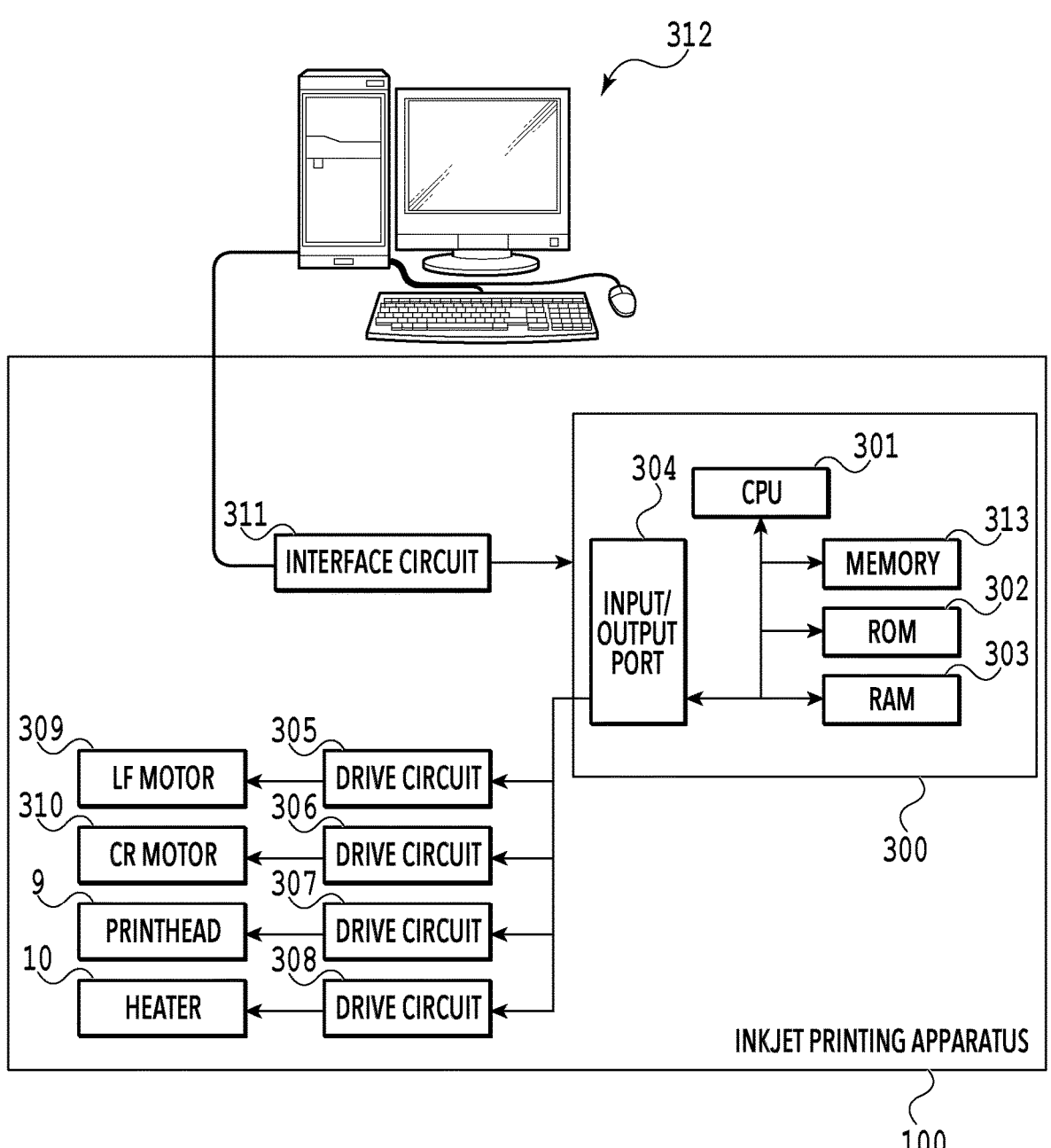
FIG. 4 is a block diagram showing a schematic configuration of a control system of the inkjet printing apparatus.

FIG. 4 is a block diagram showing a schematic configuration of the control system of the inkjet printing apparatus 100 of the present embodiment. A main control unit 300 includes a CPU 301 that executes a printing operation and processing operations such as computation, selection, discrimination, and control, a ROM 302 that stores control programs and the like to be executed by the CPU 301, a RAM 303 used as, e.g., a buffer for print data, an input/output port 304, and the like. Mask patterns to be described later and the like are stored in a memory 313. Connected to the input/output port 304 are drive circuits 305, 306, 307, 308 such as actuators for a conveyance motor (LF motor) 309, a carriage motor (CR motor) 310, the printhead 9, the heater 10, and a cutting unit. Further, the main control unit 300 is connected to a host apparatus 312 via an interface circuit 311.

The following describes details of inks constituting an ink set used in the present embodiment. Note that "parts" and "%" used below are based on the mass unless otherwise noted.

The composition of each ink is described in detail below.

The color material inks (C, M, Y, K) and the reaction liquid ink (RCT) used in the present embodiment all contain a water-soluble organic solvent. The water-soluble organic solvent preferably has a boiling point of 150° C. or above and 300° C. or below for reasons of wettability and moisture retainability of the ejection port surface of the printhead 9. From the perspective of a function as a film formation aid for resin particles and its swellability and solubility with respect to a printing medium having a resin layer formed thereon, it is particularly preferable that the water-soluble organic solvent be a ketone compound such as acetone or cyclohexanone, an ethylene glycol derivative such as tetraethyleneglycol dimethyl ether, or the like. Also particularly preferable is, e.g., a heterocyclic compound having a lactam structure, typified by N-methylpyrrolidone and 2-pyrrolidone. From the perspective of ejection performance, a content of the water-soluble organic solvent is preferably 3 wt % or above and 30 wt % or below. Specific examples of the water-soluble organic solvent include alkyl alcohols with one to four carbons, such as methyl alcohol, ethyl alcohol, n-propyl alcohol, isopropyl alcohol, n-butyl alcohol, sec-butyl alcohol, and tert-butyl alcohol, amides such as dimethylformamide and dimethyl acetamide, ketones or ketoalcohols such as acetone and diacetone alcohol, ethers such as tetrahydrofuran and dioxane, polyalkylene glycols such as polyethylene glycol and polypropylene glycol, ethylene glycol, or alkylene glycols with an alkylene group with two to six carbon atoms, such as propylene glycol, butylene glycol, triethylene glycol, 1,2,6-hexanetriol, thiodiglycol, hexylene glycol, and diethylene glycol, lower alkyl ether acetate such as polyethylene glycol monomethylether acetate, glycerine, polyalcohol lower alkyl ethers such as ethylene glycol monomethyl (monoethyl) ether, diethylene glycol methyl (or ethyl) ether, and triethylene glycol monomethyl (monoethyl) ether, polyalcohols such as trimethylolpropane and trimethylolethane, N-methyl-2-pyrrolidone, 2-pyrrolidone, and 1,3-dimethyl-2-imidazolidinone. The water-soluble organic solvents described above may be used solely or as a mixture. Also, deionized water is desirably used as water. Although a content of the water-soluble organic solvent in the reaction liquid ink (RCT) is not limited to a particular content. Meanwhile, the color material inks (C, M, Y, K) may contain a surfactant, an antifoam, an antiseptic, an antifungal, and/or the like in addition to the above components as needed in order to have a desired physical property value as needed.

Also, the color material inks (C, M, Y, K) and the reaction liquid ink (RCT) used in the present embodiment all contain a surfactant. The surfactant is used as a penetrant for the purpose of improving the penetrability of ink into an inkjet printing medium. The more the surfactant is added, the stronger the property of reducing the surface tension of ink will be, and the wettability and penetrability of the ink relative to the printing medium improve. In the present embodiment, a small amount of acetylene glycol EO adduct or the like is added as the surfactant to make adjustments so that the surface tensions of the inks may be 30 dyn/cm or below and that the difference in surface tension between the inks may be 2 dyn/cm or below. More specifically, all the inks equally have a surface tension of approximately 22 to 24 dyn/cm. The fully automatic surface tensiometer CBVP-Z (manufactured by Kyowa Interface Science Co., Ltd.) was used to measure the surface tension. The tensiometer is not limited to the above example as long as the surface tension of ink can be measured.

Also, the pHs of the inks in the present embodiment are all stable on the alkaline side, and the values are from 8.5 to 9.5. It is preferable that the PH of each ink be 7.0 or above and 10.0 or below from the perspective of preventing, e.g., elution and degradation of an ink-contacting member in the printing apparatus or in the printhead and reduction of the solubility of dispersed resin in the ink. For the pH measurement, the pH meter F-52 manufactured by HORIBA, Ltd. was used. Note that the meter is not limited to the above example as long as the pH of ink can be measured.

(Reaction Liquid)

In order to overcome the problems such as bleeding and beading, the present embodiment uses a reaction liquid to insolubilize part or all of solid components in the color material inks.

Examples of the reaction liquid include a solution containing polyvalent metal ions (such as, for example, magnesium nitrate, magnesium chloride, aluminum sulfate, or iron chloride) in order to insolubilize dissolved dye or dispersed pigment and resins. As a kind of flocculation action using cations, a system used by a low-molecular-weight cationic polymer flocculant can also be used with the aim of neutralizing the charges of water-soluble resin particles and insolubilizing anionic soluble substances.

As a different reaction system, there is an insolubilization system using a reaction liquid utilizing a pH difference. As mentioned earlier, most of typical color material inks used for inkjet printing are stable on the alkaline side due to, e.g., the properties of the color materials therein. They typically have a pH of approximately 7 to 10, and the pH is often set around mainly 8.5 to 9.5 from an industrial perspective and also considering, e.g., the influence of external environments. In order to flocculate and solidify a color material ink of such a system, an acidic solution may be mixed in to change the pH and to thereby destroy the stable state and flocculate dispersed components. With the aim of such action, a solution exhibiting acidity can be used as a reaction liquid as well.

(Water-Soluble Resin Particles)

The color material inks used in the present embodiment contain water-soluble resin particles. "Water-soluble resin particles" are polymer particles existing in water in a dispersed state. Specific examples include acrylic resin particles obtained by synthesis of, e.g., alkyl (meth)acrylate ester monomers and alkyl (meth)acrylate amide monomers through emulsion polymerization or the like. Examples further include styrene-acryl resin particles obtained by synthesis of styrene monomers with, e.g., alkyl (meth) acrylate ester monomers and alkyl (meth)acrylate amide monomers through emulsion polymerization or the like. Examples further include polyethylene resin particles, polypropylene resin particles, polyurethane resin particles, and styrene-butadiene resin particles. The resin particles may be core-shell resin particles, in which the core part and the shell part forming a resin particle have different polymer compositions from each other, or resin particles obtained by having pre-synthesized acrylic particles as seed particles and performing emulsion polymerization around the seed particles in order to control particle size. Further, the resin particles may be hybrid resin particles obtained by chemically combining difference kinds of resin particles such as acrylic resin particles and urethane resin particles.

(Compositions of the Inks)

The inks constituting the ink set used in the present embodiment are described in detail. Note that "parts" and "%" used below are based on the mass unless otherwise noted.

<Black Ink>

(Creation of Dispersion Liquid)

First, an anionic polymer P-1 [a copolymer of styrene/ butyl acrylate/acrylic acid (polymer ratio (weight ratio)=30/ 40/30), acid number 202, weight-average molecular weight 6500] was prepared. This was neutralized with a potassium hydroxide water solution and diluted with ion-exchanged water to create a uniform dispersion liquid with 10% by mass of water-soluble resin particles.

A mixture of 600 g of the above polymer solution, 100 g of carbon black, and 300 g of ion-exchanged water was mechanically agitated for a predetermined period of time, and then, non-dispersed matters including coarse particles were removed though a centrifugal separation process, thereby obtaining a black dispersion liquid. The black dispersion liquid thus obtained had a pigment density of 10% by mass.

(Creation of Ink)

To create an ink, the black dispersion liquid was used, and the following components were added thereto to obtain a predetermined density. Then, after being sufficiently mixed and agitated, these components were filtered under pressure using a microfilter with a pore size of 2.5 μm (manufactured by FUJIFILM Corporation) to prepare a pigment ink with a pigment density of 2% by mass.

The above-described black dispersion liquid: 20 parts

The above-described dispersion liquid with water-soluble resin particles: 40 parts Zonyl FSO-100 (a fluorochemical surfactant manufactured by DuPont): 0.05 parts 2-methyl-1,3-propanediol: 15 parts 2-pyrrolidone: 5 parts acetylene glycol EO adduct (manufactured by Kawaken Fine Chemicals Co., Ltd.): 0.5 parts Ion-exchanged water: the remaining parts <Cyan Ink>

(Creation of Dispersion Liquid)

First, an AB block polymer with an acid value of 250 and a number average molecular weight of 3000 was conventionally made using benzyl acrylate and methacrylic acid as raw materials, neutralized with a potassium hydroxide water solution, and diluted with ion-exchanged water to create a uniform dispersion liquid with 50% by mass of water-soluble resin particles.

A mixture of 200 g of the above polymer solution, 100 g of C. I. Pigment Blue 15:3, and 700 g of ion-exchanged water was mechanically agitated for a predetermined period of time, and then, non-dispersed matters including coarse particles were removed through a centrifugal separation process, thereby obtaining a cyan dispersion liquid. The cyan dispersion liquid thus obtained had a pigment density of 10% by mass.

(Creation of Ink)

To create an ink, the cyan dispersion liquid was used, and the following components were added thereto to obtain a predetermined density. Then, after being sufficiently mixed and agitated, these components were filtered under pressure using a microfilter with a pore size of 2.5 μm (manufactured by FUJIFILM Corporation) to prepare a pigment ink with a pigment density of 2% by mass.

The above-described cyan dispersion liquid: 20 parts

The above-described dispersion liquid with water-soluble resin particles: 40 parts Zonyl FSO-100 (a fluorochemical surfactant manufactured by DuPont): 0.05 parts 2-methyl-1,3-propanediol: 15 parts 2-pyrrolidone: 5 parts acetylene glycol EO adduct (manufactured by Kawaken Fine Chemicals Co., Ltd.): 0.5 parts Ion-exchanged water: the remaining parts <Magenta Ink>

(Creation of Dispersion Liquid)

First, an AB block polymer with an acid value of 300 and a number average molecular weight of 2500 was conventionally made using benzyl acrylate and methacrylic acid as raw materials, neutralized with a potassium hydroxide water solution, and diluted with ion-exchanged water to create a uniform dispersion liquid with 50% by mass of water-soluble resin particles.

A mixture of 100 g of the above polymer solution, 100 g of C. I. Pigment Red 122, and 800 g of ion-exchanged water was mechanically agitated for a predetermined period of time, and then, non-dispersed matters including coarse particles were removed through a centrifugal separation process, thereby obtaining a magenta dispersion liquid. The magenta dispersion liquid thus obtained had a pigment density of 10% by mass.

(Creation of Ink)

To create an ink, the magenta dispersion liquid was used, and the following components were added thereto to obtain a predetermined density. Then, after being sufficiently mixed and agitated, these components were filtered under pressure using a microfilter with a pore size of 2.5 μm (manufactured by FUJIFILM Corporation) to prepare a pigment ink with a pigment density of 3% by mass.

The above-described magenta dispersion liquid: 30 parts

The above-described dispersion liquid with water-soluble resin particles: 40 parts Zonyl FSO-100 (a fluorochemical surfactant manufactured by DuPont): 0.05 parts 2-methyl-1,3-propanediol: 15 parts 2-pyrrolidone: 5 parts acetylene glycol EO adduct (manufactured by Kawaken Fine Chemicals Co., Ltd.): 0.5 parts Ion-exchanged water: the remaining parts <Yellow Ink>

(Creation of Dispersion Liquid)

First, the above-described anionic polymer P-1 was neutralized with a potassium hydroxide and diluted with ion-exchanged water to create a uniform dispersion liquid with 10% by mass of water-soluble resin particles.

A mixture of 300 g of the above polymer solution, 100 g of C. I. Pigment Yellow 74, and 600 g of ion-exchanged water was mechanically agitated for a predetermined period of time, and then, non-dispersed matters including coarse particles were removed though a centrifugal separation process, thereby obtaining a yellow dispersion liquid. The yellow dispersion liquid thus obtained had a pigment density of 10% by mass.

(Creation of Ink)

The following components were mixed and then sufficiently agitated to dissolve and disperse, and after that, they were filtered under pressure using a microfilter with a pore size of 1.0 μm (manufactured by FUJIFILM Corporation) to prepare a pigment ink with a pigment density of 4% by mass.

The above-described yellow dispersion liquid: 40 parts

The above-described dispersion liquid with water-soluble resin particles: 40 parts Zonyl FSO-100 (a fluorochemical surfactant manufactured by DuPont): 0.025 parts 2-methyl-1,3-propanediol: 15 parts 2-pyrrolidone: 5 parts acetylene glycol EO adduct (manufactured by Kawaken Fine Chemicals Co., Ltd.): 1 part Ion-exchanged water: the remaining parts <Reaction Liquid>

The reaction liquid used in the present embodiment contains a reactive component that flocculates or gels a pigment contained in an ink by reacting with the pigment. This reactive component is, specifically, a component that can destroy the dispersion stability of an ink having a pigment stably dispersed in an aqueous vehicle by action of an ionic group by being mixed with the ink on a printing medium or the like. Specifically, glutaric acid is used in the present embodiment.

Note that glutaric acid does not necessarily have to be used, and various organic acids or polyvalent metal salts can be used as a reactive component for the reaction liquid in the present embodiment as long as they are water-soluble. A content of organic acid or polyvalent metal salt is, in relation to the overall mass of compositions contained in the reaction liquid, preferably 0.1% by mass or above and 90.0% by mass or below or more particularly 1.0% by mass or above and 70.0% by mass or below.

(Creation of Ink)

In the present embodiment, glutaric acid (manufactured by FUJIFILM Wako Pure Chemical Corporation) is used as described above, and the following components were mixed to create a reaction liquid 1.

Glutaric acid: 2 parts 2-pyrrolidone: 5 parts 2-methyl-1,3-propanediol: 15 parts acetylene glycol EO adduct (manufactured by Kawaken Fine Chemicals Co., Ltd.): 0.5 parts Ion-exchanged water: the remaining parts A description is given below of a printing medium used in the present embodiment.

In the present embodiment, a low-permeability printing medium into which moisture is difficult to penetrate is used. A low-permeability printing medium is a medium which absorbs no or extremely little moisture. Thus, in a case where an aqueous ink containing no organic solvent is used, the ink will be repelled, and it is therefore difficult to form an image thereon. Meanwhile, a low-permeability printing medium has excellent resistance to water and weather and is therefore suitable to be used for a printed product for outdoor use. Usually, a printing medium with a contact angle of 45° or above or preferably 60° or above to water at 25° C. is used.

Examples of the low-permeability printing medium include a printing medium having a plastic layer formed as an outermost surface of a base material, a printing medium having no ink receiving layer formed on a base material, and a sheet, film, or banner made of glass, yupo paper, or plastic. Examples of a plastic coating include vinyl chloride, polyethylene terephthalate, polycarbonate, polystyrene, polyurethane, polyethylene, and polypropylene. Having excellent resistance to water, light, and abrasion, these low-permeability printing media are generally used to print a printed product for outdoor display.

As a method for evaluating the permeability of a printing medium, for example, the Bristow's method described in "Method for Determining the Liquid Absorbability of Paper and Board" in the paper and pulp testing method No. 51 in JAPAN TAPPI can be used. In the Bristow's method, a predetermined amount of ink is poured into a storage container having an opening slit with a predetermined size, and is brought into contact, through the slit, with a printing medium processed into a strip shape and wound around a disk. Then, the disk is rotated with the storage container fixed in position, and the area (length) of an ink strip transferred to the printing medium is measured. Based on this area of the ink strip, a transfer amount $(ml \cdot m^{-2})$ per second per unit area can be calculated. In the present embodiment, a printing medium is regarded as a low-permeability printing medium in a case where its ink transfer amount (absorption amount) measured with the Bristow's method at 30 msec1/2 is smaller than 10 $(ml \cdot m^{-2})$. Thus, a low-permeability printing medium may be an impermeable printing medium.

In the present embodiment, Scotchcal Graphic Film (IJ1220-10), which is an adhesive polyvinyl chloride film manufactured by 3M, was used as a low-permeability printing medium.

The printing apparatus of the present embodiment prints an image using what is called a multi-pass printing method, in which a plurality of scans are performed to print the image on a predetermined region on a printing medium using the inks (C, M, Y, K, and RCT). The following describes the multi-pass printing method.

Figure 5:
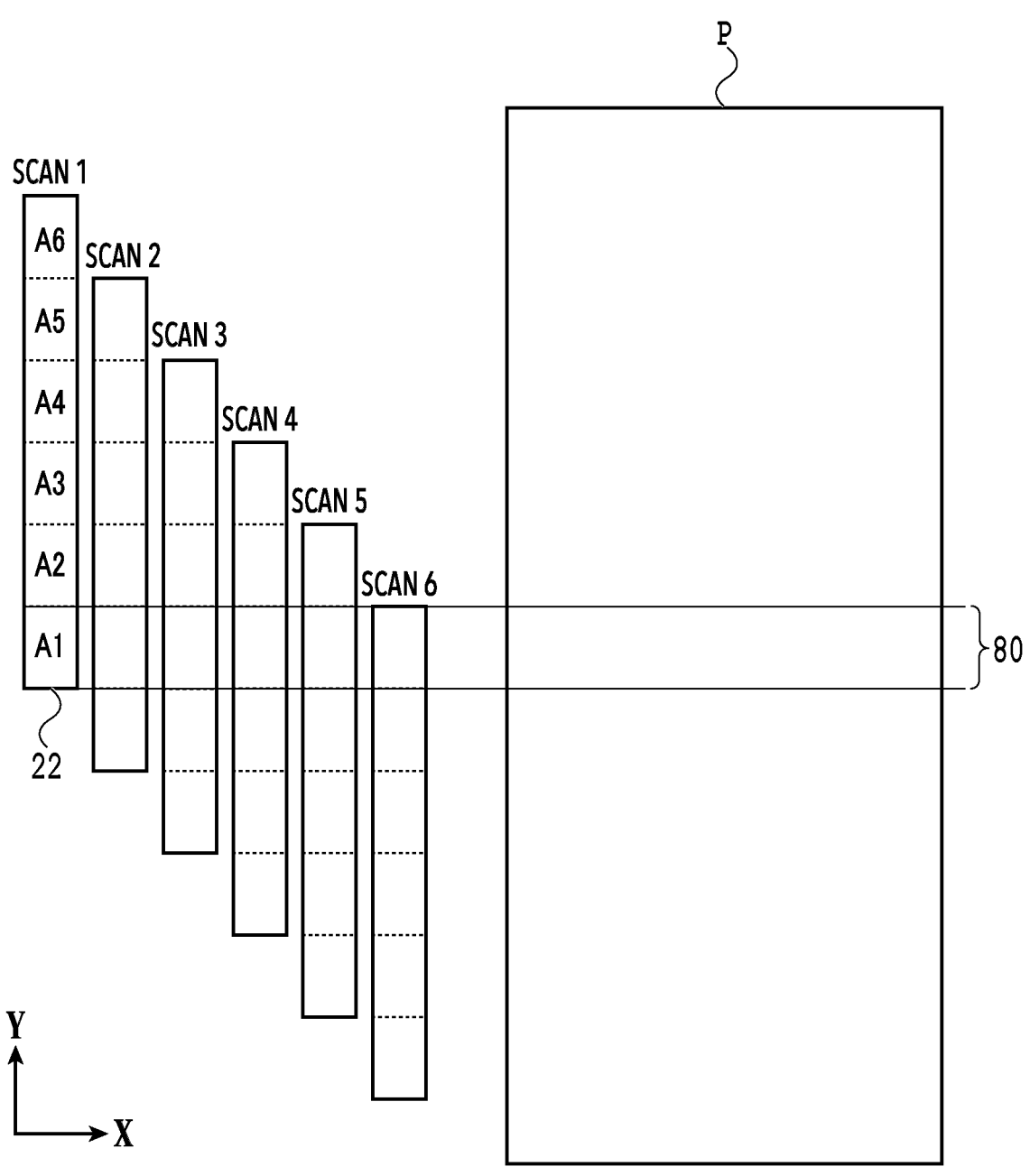
FIG. 5 is a diagram illustrating a multi-pass printing method.

FIG. 5 is a diagram illustrating the multi-pass printing method. As an example, the following describes a case where an image is formed on a predetermined region by ejection of ink from six ejection port groups A1 to A6, obtained by dividing each ejection port array 22 in the Y-direction, with six scans. Note that in actuality, the printing medium Pis conveyed downstream in the Y-direction between scans of the printhead 9, but for ease of illustration, FIG. 5 shows a diagram where the printhead 9 is moved upstream in the Y-direction between scans.

First, in the first scan (Scan 1), the printhead 9 is scanned at a position on the printing medium P where a predetermined region 80 and the ejection port group A1 in the ejection port array 22 face each other. In this scan, inks are ejected from the ejection port group A1 to the predetermined region 80 in accordance with print data on the respective types of inks corresponding to the first scan and with a mask pattern stored in the memory 313.

After Scan 1, the printing medium P is conveyed in the Y-direction by a distance corresponding to a single ejection port group. After that, the second scan (Scan 2) is performed, ejecting the inks from the ejection port group A2 to the predetermined region 80. After that, the conveyance of the printing medium and the ink ejection from the printhead are performed alternately, ejecting the inks from the ejection port groups A3 to A6 to the predetermined region 80 in the third to sixth scans, respectively. Mask patterns for the ejection port groups A1 to A6 complement one another, and in this way, multi-pass printing on the predetermined region 80 is completed.

Such multi-pass printing may have a pause (interruption) for a certain period of time between a certain print scan and the subsequent print scan. There are several reasons for a pause, and the following describes typical ones of the reasons. A first one of the typical reasons for a pause is to wipe off ink on the ejection port surface of the printhead 9 using a mechanism for moving a cloth or a wiper. This pause would take a few seconds. A second one of the reasons is to recover from ink ejection failure by sucking ink from the ejection ports 30 of the printhead 9 using a suction mechanism. This pause would take ten to several tens of seconds. Other reasons for a pause include a pause for bringing down the temperature of the printhead 9 which has risen too much and a pause for cutting the printing medium P.

In a case where the printing operation is interrupted by such a pause, a region printed by a scan performed after the pause may experience a change in color, density, or glossiness, leading to unevenness.

Figure 6B:
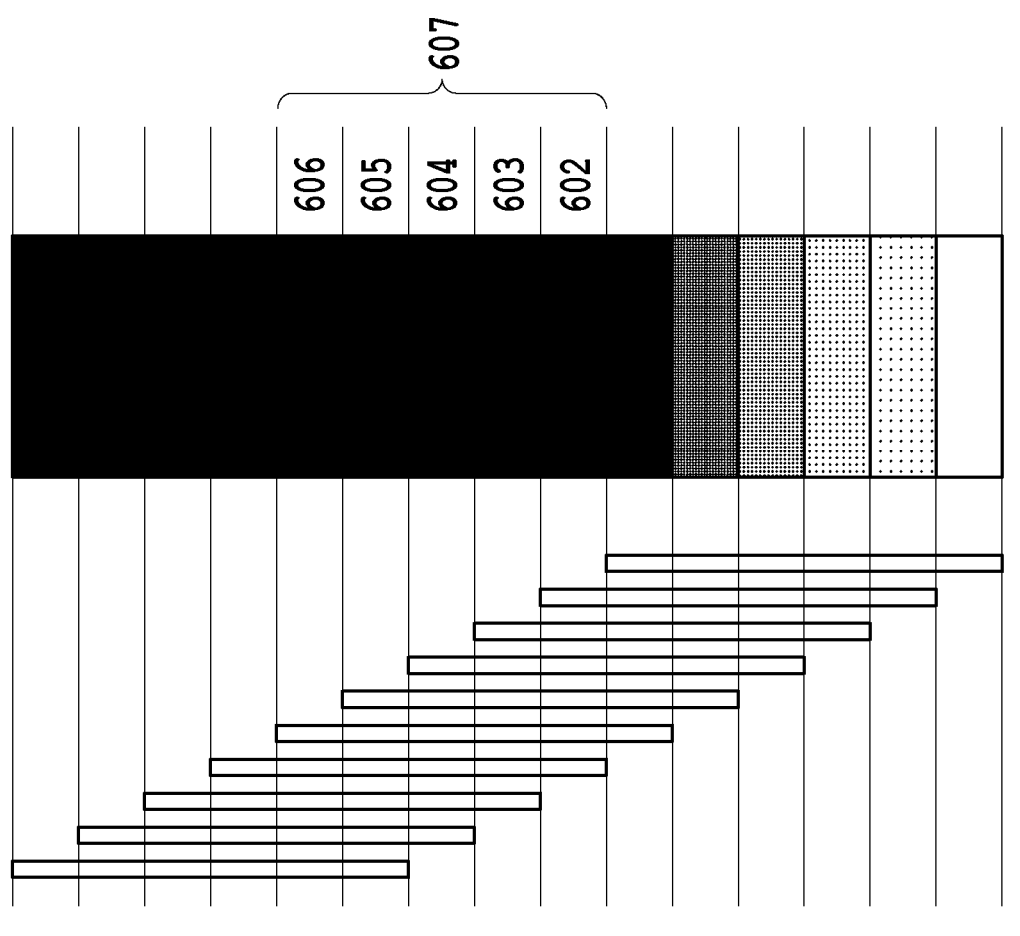
FIG. 6B is a diagram illustrating unevenness caused by a pause of a printing operation.
Figure 6A:
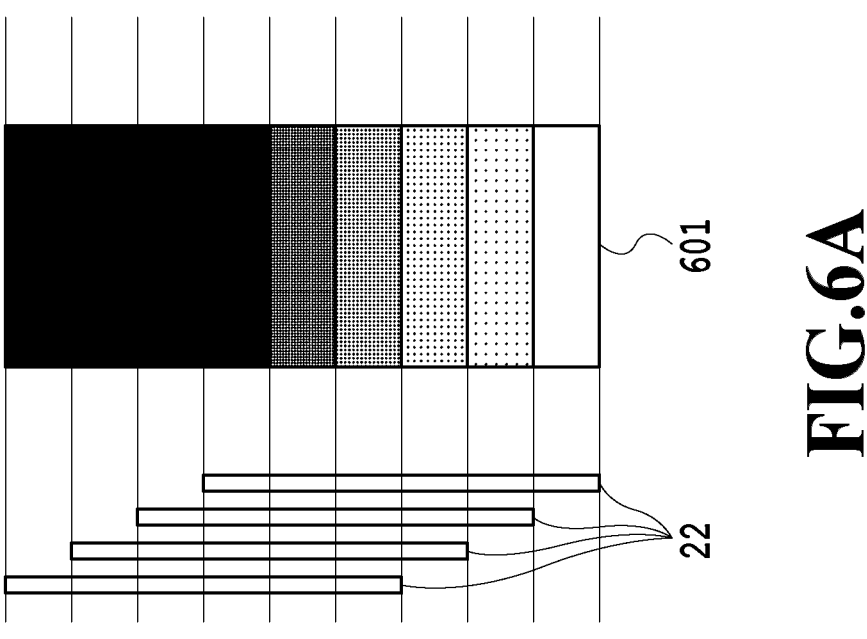
FIG. 6A is a diagram illustrating unevenness caused by a pause of a printing operation.

FIGS. 6A and 6B are diagrams illustrating unevenness caused by a pause of a printing operation. FIG. 6A shows a printed product immediately before a pause of a printing operation and positions on the ejection port array 22 that perform printing. FIG. 6B shows a printed product printed further after the pause of the printing operation and the positions on the ejection port array 22 that perform printing. FIG. 6B also shows a region 607 whose printing is interrupted by a pause, as a region which was in a process of being printed at the time of a pause of a printing operation. Unevenness attributable to a pause of a printing operation occurs in this region 607 whose printing is interrupted by a pause. Ink smudging is believed to be a possible cause for the unevenness.

Figures 7A, 7B, 7C:
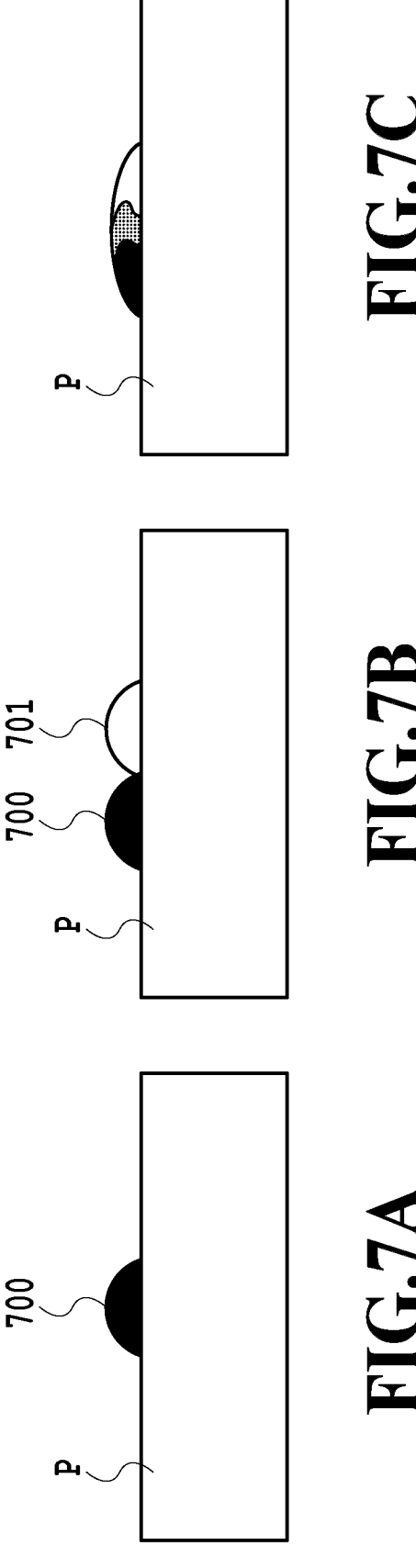
FIG. 7A is a diagram showing the phenomenon in which ink droplets smudge.
FIG. 7B is a diagram showing the phenomenon in which ink droplets smudge.
FIG. 7C is a diagram showing the phenomenon in which ink droplets smudge.
Figures 8A, 8B, 8C:
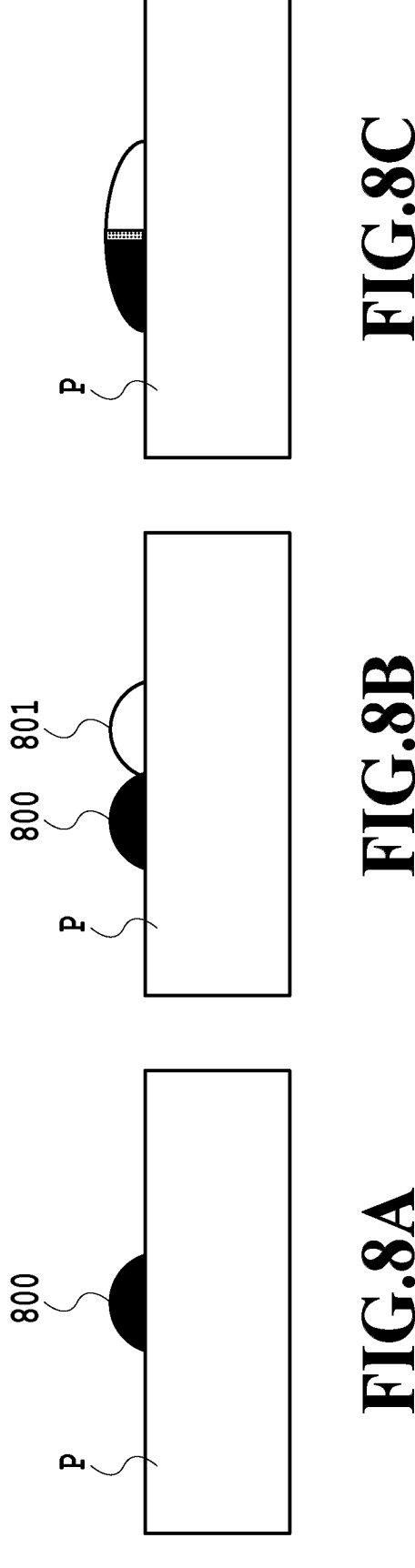
FIG. 8A is a diagram showing the phenomenon in which ink droplets smudge.
FIG. 8B is a diagram showing the phenomenon in which ink droplets smudge.
FIG. 8C is a diagram showing the phenomenon in which ink droplets smudge.

FIGS. 7A to 7C are diagrams showing the phenomenon in which ink droplets smudge in the following case: printing is performed normally without the printing operation being interrupted by a pause, and no air is blown from the platen air blowing unit 14. FIGS. 8A to 8C are diagrams the phenomenon in which ink droplets smudge in the following case: the printing operation is interrupted by a pause after the first pass, and no air is blown from the platen air blowing unit 14.

An ink droplet 700 is ejected onto the printing medium P in the first pass as shown in FIG. 7A, and then in the second pass, an ink droplet 701 of the second pass is ejected to a position adjacent to the inkjet droplet 700 of the first pass as shown in FIG. 7B. After a certain period of time passes since the ejection of the ink of the second pass, smudging occurs as shown in FIG. 7C.

By contrast, a description is given of a case where the printing operation is interrupted by a pause after the first pass. As shown in FIG. 8A, an ink droplet 800 of the first pass is ejected like in FIG. 7A, and then after the printing operation is interrupted by a pause, an ink droplet 801 of the second pass is ejected to a position adjacent to the inkjet droplet 800 of the first pass, as shown in FIG. 8B. In this case, due to a lapse of a certain period of time, the ink droplet 800 of the first pass has increased in viscosity due to moisture therein drying. The ink droplet 801 of the second pass is ejected there, but due to the increased viscosity of the ink droplet 800, smudging occurs only to a smaller degree (see FIG. 8C).

As can be seen from a comparison of smudging between FIG. 7C showing a case where the printing operation is not interrupted by a pause and FIG. 8C showing a case where the printing operation is interrupted by a pause, the smudge in FIG. 8C is contained within a certain area. Such smudging is visually perceived as a difference in the degree of smudging or a difference in color or glossiness and therefore causes unevenness. Note that with a short period of pause, ink droplets dry only a little, causing relatively minor unevenness because the difference in smudging from usual printing is not large. With a long period of pause, ink droplets dry excessively, causing a higher degree of unevenness because the difference in smudging from usual printing is large.

Figures 9A, 9B, 9C:
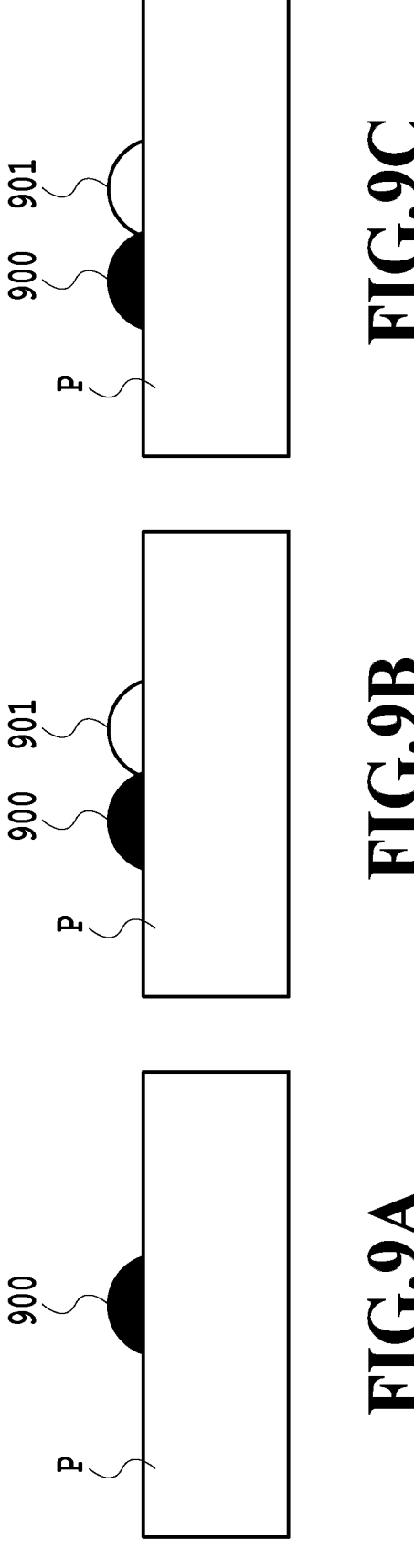
FIG. 9A is a diagram showing the phenomenon in which ink droplets smudge.
FIG. 9B is a diagram showing the phenomenon in which ink droplets smudge.
FIG. 9C is a diagram showing the phenomenon in which ink droplets smudge.

FIGS. 9A to 9C are diagrams showing the phenomenon in which ink droplets smudge in the following case: a printing operation is interrupted by a pause after the first pass, and air is blown from the platen air blowing unit 14. An ink droplet 900 of the first pass is ejected in FIG. 9A, and then after the printing operation is interrupted by a pause, an ink droplet 901 of the second pass is ejected to a position adjacent to the inkjet droplet 900 of the first pass as shown in FIG. 9B. During the pause, the air blowing accelerates evaporation of moisture in the ink droplet 900 of the first pass. Drying of the ink droplet is thus promoted to have an even higher viscosity than in the case where the air blowing is stopped. As shown in FIG. 9C, the ink droplet of the first pass is increased in viscosity also by a lapse of a certain period of time since the printing of the ink droplet of the subsequent pass. For this reason, smudging occurs to an even smaller degree. Thus, a contact with the ink droplet of the subsequent pass causes almost no smudging, and the ink droplet 900 and the ink droplet 901 are present independently. In this way, blowing air to the printing unit from the platen air blowing unit 14 during a pause of the printing operation tends to cause noticeable unevenness by promoting drying of moisture in the ink droplets.

Thus, in the present embodiment, on/off control of the platen air blowing unit 14 is performed according to the length of a pause time among various types of pauses. The following describes printing control performed by the printing apparatus 100 of the present embodiment.

Figure 10:
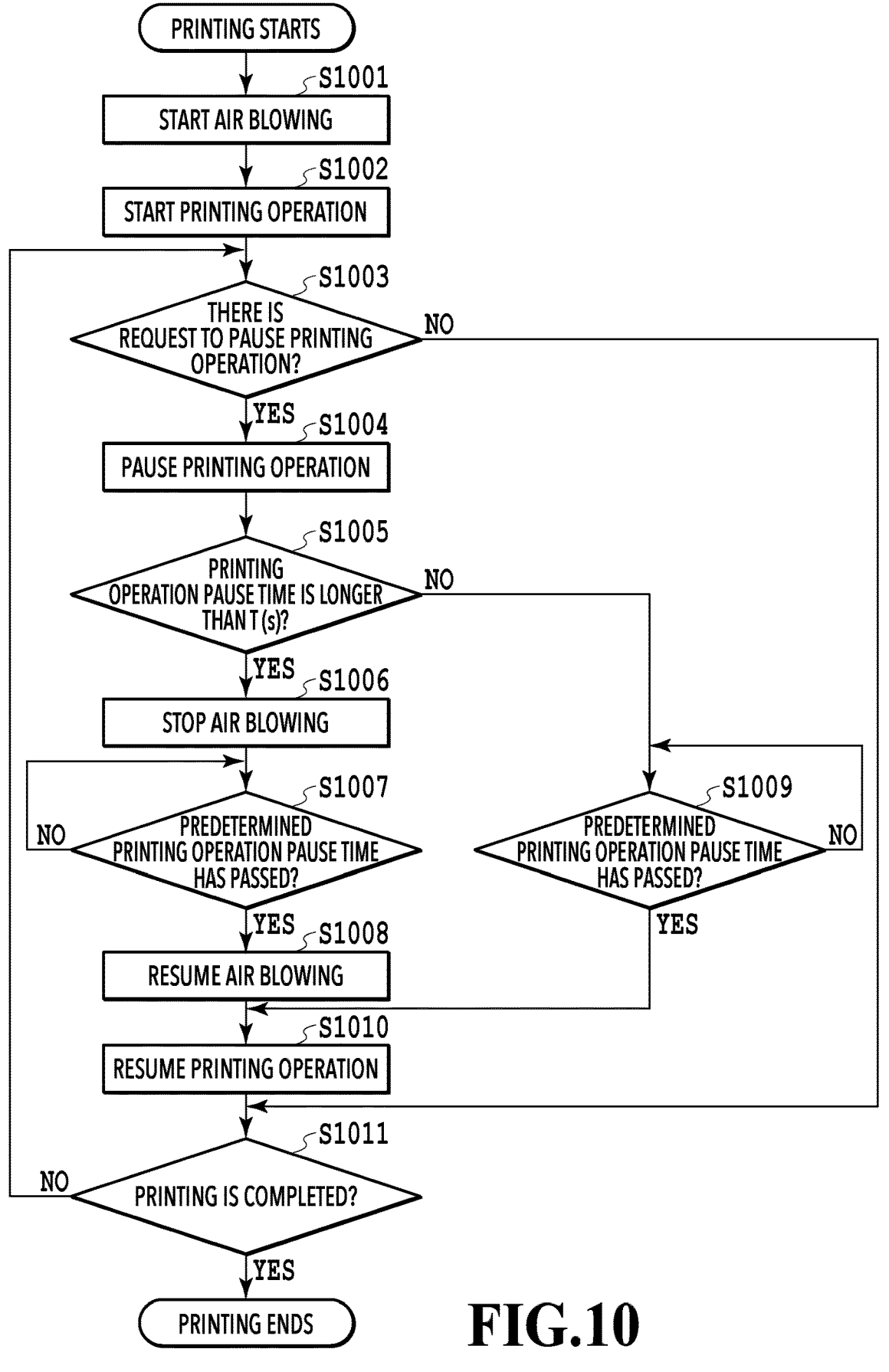
FIG. 10 is a flowchart showing printing control in the printing apparatus.

FIG. 10 is a flowchart showing printing control performed by the printing apparatus 100 of the present embodiment. Printing control performed by the printing apparatus 100 of the present embodiment is described below using the flowchart in FIG. 10. The series of processes shown in FIG. 10 are performed by the CPU 301 of the printing apparatus 100 loading program code stored in the ROM 302 into the RAM 303 and executing the program code. Alternatively, some or all of the steps in FIG. 10 may be implemented by hardware such as an ASIC or an electric circuit. Note that the letter "S" in the description of the processing means that the processing is a step in the flowchart.

Once printing control is started, in S1001, the platen air blowing unit 14 starts blowing air to the surface (print region) of the printing medium P on the platen 4. After that, a printing operation is started in S1002, and it is determined in S1003 whether there is a request to pause the printing operation. If there is no request to pause the printing operation (NO), the printing operation is continued, and it is determined in S1011 whether the printing is completed. If it is determined in S1011 that the printing is completed, the processing ends. If the printing is not completed, the processing proceeds back to S1003 with the printing operation being continued.

If it is determined in S1003 that there is a request to pause the printing operation (YES), the processing proceeds to S1004 to pause the printing operation, and then it is determined in S1005 whether an expected printing operation pause time is above a predetermined threshold T (s). If the printing operation pause time is equal to or below the predetermined threshold T (s) (NO), the processing proceeds to S1009 to determine whether a predetermined printing operation pause time has passed (whether an operation such as a wiping operation or a suction and recovery operation was completed, and the printing operation is resumable). Then, the processing in S1009 is repeated until the predetermined printing operation pause time passes. After that, the printing operation is resumed in S1010.

If it is determined in S1005 that the expected printing operation pause time is above the predetermined threshold T (s) (YES), the processing proceeds to S1006 in which the platen air blowing unit 14 stops blowing air to the surface of the printing medium P on the platen 4. After that, it is determined in S1007 whether the predetermined printing operation pause time has passed, and the processing is repeated until the predetermined printing operation pause time passes. If it is determined in S1007 that the predetermined printing operation pause time has passed, the processing proceeds to S1008 to resume the air blowing, and the printing operation is resumed in S1010. After that, it is determined in S1011 whether the printing is completed. If the printing is not completed, the processing proceeds back to S1004 to repeat the processing. If it is determined in S1011 that the printing is completed, the processing ends.

In this way, in the present embodiment, in a case where an expected pause time is above a predetermined threshold T (s), the platen air blowing unit 14 stops blowing air to the surface of the printing medium on the platen. This reduces promotion of drying of ink droplets and therefore makes it possible to cause less unevenness.

Note that in the present embodiment, the threshold T (s) may be zero (T (s)=0 (s)). Then, in a case where the printing is paused even just for a moment, the platen air blowing unit 14 stops blowing air to the surface of the printing medium P on the platen 4.

Other Embodiments

Other embodiments different from the above embodiment are described below. In the above embodiment, the platen air blowing unit 14 stops blowing air to the surface of the printing medium P in a case where a printing operation pause time exceeds a predetermined threshold T (s). However, instead of being completely stopped, the air blowing may be performed at a wind speed lower than that during printing.

Also, air blowing by the platen air blowing unit 14 may be controlled in stages based on the length of the printing operation pause time. Specifically, a plurality of predetermined thresholds T (s) are prepared and set as, for example, a threshold T1 (s), a threshold T2 (s), and a threshold T3 (s) in order from the longest, and corresponding wind speeds for the platen air blowing unit 14 are set as a wind speed 1, a wind speed 2, and a wind speed 3 in order from the slowest. Based on this, control may be performed so that the longer the printing operation pause time, the slower the wind speed of air blown.

Also, the value of the threshold T (s) may be different depending on the type of ink. A plurality of thresholds T (s) may be prepared, and for inks requiring short periods of air blowing time for fixation of ink droplets (an easily-fixated ink), it is preferable not to perform excessive drying by air blowing because the inks are easily fixated. Thus, for an easily-fixated ink, a smaller threshold T (s) is used to shorten the air blowing time, so that density unevenness may not be caused by excessive drying.

The value of the threshold T (s) may also be different depending on the type of the printing medium P. For example, the smaller the contact angle of a printing medium to an ink, the shorter it takes for the ink to be fixated. Thus, it is preferable that the smaller the contact angle of a printing medium, the shorter the air blowing time. Thus, a smaller value may be set as the threshold T (s) for a printing medium with a smaller contact angle to an ink.

The value of the threshold T (s) may be changed based on the ambient environment temperature and humidity. For example, in a high temperature and low humidity environment where ink easily dries, the time it takes for the ink to be fixated is short. In that case, it is preferable that the air blowing time be shortened so as not to dry the ink excessively. Thus, relations between environment temperatures/humidities and inks used are checked in advance, and a table of environment temperatures, environment humidities, and the thresholds T (s) is created. Then, based on the table, a smaller value of the threshold T (s) may be set for a drier environment, according to the environment temperature and the environment humidity.

Also, in multi-pass printing, the larger the number of print scans (passes), the longer it takes for the printing and thus the more easily the ink is fixated. Thus, excessive drying is preferably reduced in that case. Thus, a smaller value of the threshold T (s) may be set for a larger number of print scans, so that drying of ink droplets may be promoted less.

Also, the slower the moving speed of the carriage, the faster the ejected droplets fly, and the shorter it takes for the ink landed on the printing medium to be fixated. For this reason, the threshold T (s) may be set to a smaller value in a case where the moving speed of the carriage is lower, so that drying of ink droplets may be promoted less.

Thus selectively using a threshold T (s) depending on the conditions makes it possible to cause less density unevenness. Note that conditions that determine the value of the threshold T (s) are not limited to the ones above as long as they change how much air blowing promotes fixation of ink droplets.

Note that the threshold T (s) may be selected automatically by the apparatus or manually by a user.

Also, the conditions described in the other embodiments may be used in combination with the above embodiment if possible. In that case, the RAM 303 includes a table in which thresholds T (s) are set in correspondence to the printing operation pause times described in the above embodiment and the conditions described in the other embodiments, and the value of the threshold T (s) may be employed based on the table.

Also, although the above embodiment performs multi-pass printing as an example, the present invention is not limited to this. Also at a border of a predetermined band and the subsequent band in single-pass printing, a degree of smudging differs depending on the period of time between print scans for these bands, and the longer the pause time, the more noticeable a connection streak between the bands may become. Thus, even with single-pass printing, noticeability of a connection streak can be controlled by employing the control method described in the above embodiment.

Further, although a combination of four colors and a reaction liquid ink is used in the embodiment described above, the present invention is not limited to this. The present invention may be applied to printing without the reaction liquid or to printing using only black.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038989, filed Mar. 13, 2023, which is hereby incorporated by reference wherein in its entirety.

What is claimed is:

1. A printing apparatus comprising:
a printing unit configured to perform printing operation by ejecting a liquid onto a printing medium;
a support unit configured to support the printing medium to be printed by the printing unit;
a roller configured to convey the printing medium in a conveyance direction toward the support unit;
a blowing unit, provided upstream of the printing unit in the conveyance direction, configured to blow air onto the printing medium supported by the support unit in a state where the printing operation is performed by the printing unit; and
a control unit configured to perform control such that
the air is blown at a first speed in a case where an interruption time during which the printing operation is interrupted before completion of the printing operation is a first time, and
the air is blown at a second speed which is faster than the first speed in a case where the interruption time is a second time which is shorter than the first time.

2. The printing apparatus according to claim 1, wherein the first speed is zero.

3. The printing apparatus according to claim 1, wherein the second time is zero.

4. The printing apparatus according to claim 1, comprising a recovery unit configured to perform a recovery operation of recovering the printing unit, wherein
the control unit causes the recovery operation to perform the recovery operation in a state where the printing operation is interrupted before completion of the printing operation.

5. The printing apparatus according to claim 1, wherein
the control unit interrupts the printing operation before completion of the printing operation in a case where a temperature of the printing unit is a first temperature, and
the control unit does not interrupt the printing operation in a case where the temperature of the printing unit is a second temperature which is lower than the first temperature.

6. The printing apparatus according to claim 1, wherein the control unit interrupts the printing operation in a state where the printing medium is cut.

7. The printing apparatus according to claim 1, wherein the first time in a case where a contact angle between the liquid and a surface of the printing medium is a first angle is shorter than the first time in a case where the contact angle is a second angle which is larger than the first angle.

8. The printing apparatus according to claim 1, wherein the first time in a case where an environment temperature is a first temperature is shorter than the first time in a case where the environment temperature is a second temperature which is lower than the first temperature.

9. The printing apparatus according to claim 1, wherein the first time in a case where an environment humidity is a first humidity is shorter than the first time in a case where the environment humidity is a second humidity which is higher than the first humidity.

10. The printing apparatus according to claim 1, further comprising:
a carriage configured to scan the printing unit, wherein
the printing unit performs multi-pass printing which completes printing on a predetermined region on the printing medium by performing n times of scanning on the predetermined region.

11. The printing apparatus according to claim 1, wherein
the printing unit performs printing by moving relative to the printing medium, and
in the control unit, the first time in a case where a moving speed of the printing unit is a first speed is shorter than the first time in a case where the moving speed is a second speed which is faster than the first speed.

12. The printing apparatus according to claim 1, wherein the blowing unit includes a heater to heat air to be blown onto the printing medium.

13. The printing apparatus according to claim 1, further comprising a heating unit that heats the printing medium printed by the printing unit.

14. The printing apparatus according to claim 13, wherein the liquid contains at least one of a water-soluble organic solvent and water-soluble resin particles.

15. The printing apparatus according to claim 13, wherein the printing unit ejects a color material ink and a reaction liquid for insolubilizing part or all of a solid component in the color material ink.

16. The printing apparatus according to claim 1, wherein the blowing unit blows the air at the second speed to the printing medium supported by the support unit during the printing operation.

17. A printing method for controlling a printing apparatus including a printing unit configured to perform printing operation by ejecting a liquid to onto a printing medium, a support unit configured to support the printing medium to be printed by the printing unit, a roller configured to convey the printing medium in a conveyance direction toward the support unit, and a blowing, provided upstream of the printing unit in the conveyance direction, configured to blow air onto the printing medium supported by the support unit, the printing method comprising:

performing the printing operation;

blowing the air at a first speed in a case where an interruption time during which the printing operation is interrupted before completion of the printing operation is a first time; and blowing the air at a second speed which is faster than the first speed in a case where the interruption time is a second time which is shorter than the first time.

18

18. A non-transitory computer-readable storage medium storing a program for causing a computer to execute a printing method for controlling a printing apparatus including a printing unit configured to perform printing operation by ejecting a liquid onto a printing medium, a support unit configured to support the printing medium to be printed by the printing unit, a roller configured to convey the printing medium in a conveyance direction toward the support unit, and a blowing unit, provided upstream of the printing unit in the conveyance direction, configured to blow air onto the printing medium supported by the support unit, the printing method comprising:

performing the printing operation;

blowing the air at a first speed in a case where an interruption time during which the printing operation is interrupted before completion of the printing operation is a first time; and blowing the air at a second speed which is faster than the first speed in a case where the interruption time is a second time which is shorter than the first time.

\* \* \* \* \*